US007550885B2

(12) United States Patent
Takagi et al.

(10) Patent No.: US 7,550,885 B2
(45) Date of Patent: Jun. 23, 2009

(54) RECIPROCAL VIBRATION GENERATOR

(75) Inventors: Takahiro Takagi, Ueda (JP); Masami Yamazaki, Ueda (JP)

(73) Assignees: Sanyo Seimitsu Co., Ltd., Ueda-Shi (JP); Sanyo Electric Co., Ltd., Moriguchi-Shi (JP)

( * ) Notice: Subject to any disclaimer, the term of this patent is extended or adjusted under 35 U.S.C. 154(b) by 174 days.

(21) Appl. No.: 11/710,584

(22) Filed: Feb. 26, 2007

(65) Prior Publication Data

US 2007/0207672 A1 Sep. 6, 2007

(30) Foreign Application Priority Data

Feb. 28, 2006 (JP) ............................ 2006-052723

(51) Int. Cl.
*H02K 7/065* (2006.01)

(52) U.S. Cl. ........................................................ 310/81

(58) Field of Classification Search ................. 439/500, 439/68; 310/12-15, 81, 71
See application file for complete search history.

(56) References Cited

U.S. PATENT DOCUMENTS 6,377,145 B1 * 4/2002 Kumagai .................... 335/274
6,486,579 B1 * 11/2002 Furuya et al. ................. 310/81
6,628,028 B2 * 9/2003 Yoshida et al. ................ 310/91
7,170,205 B2 * 1/2007 Won et al. ...................... 310/36
7,224,090 B2 * 5/2007 Oh et al. ....................... 310/14

FOREIGN PATENT DOCUMENTS

JP 2003-305409 10/2003

* cited by examiner

*Primary Examiner*—Neil Abrams
(74) *Attorney, Agent, or Firm*—Kratz, Quintos & Hanson, LLP

(57) ABSTRACT

A reciprocal vibration generator occupying a small area on a board and able to be mounted by solder reflow, the reciprocal vibration generator provided with a cylindrical case body in which a weight is suspended and supporting a flat spring, a permanent magnet attached to the bottom side of the weight, and a bottom lid carrying an air core toroidal core for making the weight vibrate in the up-down direction by magnetic attraction or magnetic repulsion of this permanent magnet and closing a bottom opening of the case body. The bottom lid is an insert molded board comprised of three terminal boards insulated and separated by a molding plastic. Outside surfaces at the recesses of the terminal boards projecting down from the bottom surface of the molding plastic form board connection patterns for solder reflow.

11 Claims, 10 Drawing Sheets

(B)

Fig.10B
Fig. 10A
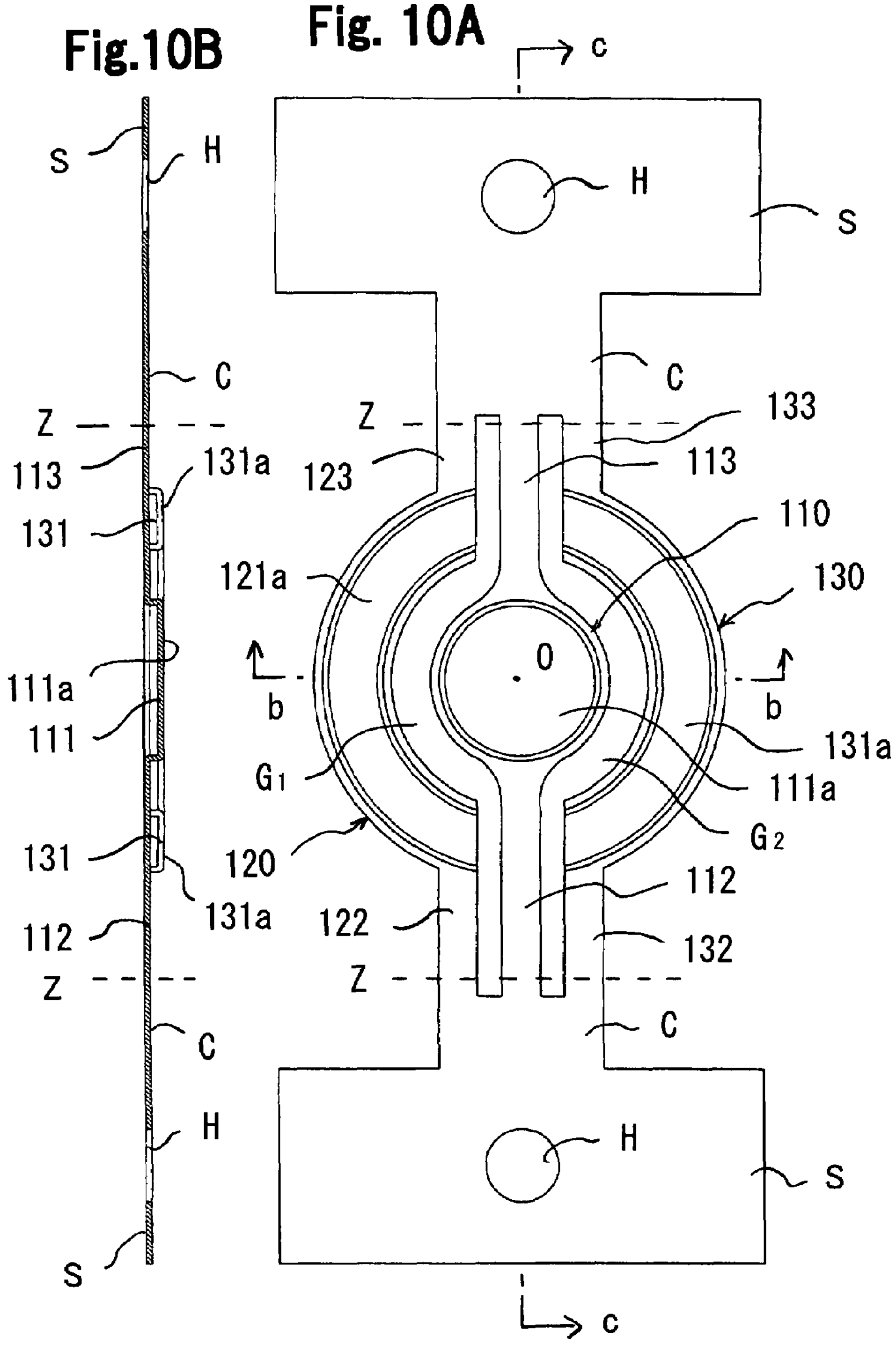
Fig. 10C
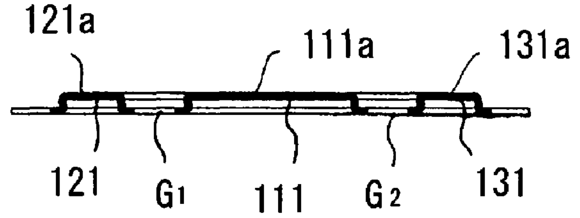

RECIPROCAL VIBRATION GENERATOR

CROSS-REFERENCE TO RELATED APPLICATION

This application is based upon and claims priority from Japanese Patent Application No. 2006-052723, filed on Feb. 28, 2006, the contents being incorporated herein by reference.

BACKGROUND OF THE INVENTION

1. Field of the Invention

The present invention relates to a reciprocal vibration generator mounted in a mobile phone etc., more particularly relates to an improvement of the structure of a bottom lid closing a bottom opening of a case body.

2. Description of the Related Art

In the past, among reciprocal vibration generators making a weight move reciprocally in an up-down direction, as shown in Japanese Patent Publication (A) No. 2003-305409 (FIG. 6), one was known provided with a thin sound board supported at part of a housing, an excitation coil formed by a printed circuit on the sound board, a magnetic generator set close to the sound board with a clearance, and a plate-shaped elastic member carried on this magnetic generator through a weight, the outer circumference of this plate-shaped elastic member being supported at a base forming part of the housing, and the moving parts comprised of the magnetic generator and weight being made to move up and down.

In this reciprocal vibration generator, the excitation coil is positioned at the top opening side of the housing, its ends are fastened to the tops (first ends) of crank shaped power feed terminals serving also as the mounting legs arranged at the rising part of the base, and the mounting legs of the power feed terminals (second ends) are fastened by soldering to the printed circuit board at the equipment side.

However, the mounting legs (second ends) of the power feed terminals are simple projection-shaped terminal parts projecting from the bottom end of the housing in the radial direction. Sufficient fastening space cannot be secured, so this cannot be fastened to the patterns on the board by solder reflow. Of course, it is possible to form a broad terminal surface, but this would invite an increase in the area occupied on the board compared with the area of the bottom of the housing.

SUMMARY OF THE INVENTION

An object of the present invention is to provide a reciprocal vibration generator occupying little space on the board and mounted on the board by solder reflow.

To achieve the above object, the present invention provides a reciprocal vibration generator provided with a case body supporting an elastic member from which a weight is suspended in a space, a permanent magnet attached to the weight, and a bottom lid carrying an excitation coil for making the weight vibrate in the up-down direction by magnetic attraction or magnetic repulsion of this permanent magnet and closing a bottom opening of the case body, wherein the bottom lid is an insert molded board comprised of first and second terminal boards, each having an end connection terminal part connecting an end of the excitation coil inside the case body, insulated and separated from each other by a molding plastic, the terminal boards having board connection patterns projecting downward from a bottom surface of the molding plastic.

Preferably, the board connection pattern surfaces are outside surfaces of recesses formed in the terminal boards in the thickness direction.

Preferably, board connection patterns of the first terminal board are formed at the center surface at the bottom surface of the bottom lid exposed in a range including a reference point through which a reference line passes in the maximum displacement direction of the elastic member, and board connection pattern of the second terminal board are formed at a first surrounding surface at the bottom surface of the bottom lid exposed in a range including the center surface.

Preferably, each terminal board has lead wire connection terminal parts at extension tabs projecting to the sides further from the case body.

Preferably, the bottom lid includes as an insert member a dummy terminal board having board connection patterns projecting downward from the bottom surface of the molding plastic, and the board connection patterns of this dummy terminal board are formed at a second surrounding surface in a substantially 180° rotationally symmetric relationship with the first surrounding surface about the reference point.

Preferably, the center surface is circular and each surrounding surface is an arc-shaped surface.

Preferably, a pair of the end connection terminal parts are positioned at the same ends of the first and second terminal boards and a pair of the lead wire connection terminal parts are positioned at the same other ends of the first and second terminal boards.

Preferably, the excitation coil is an air core toroid coil, and the bottom lid has a positioning circumferential groove at its inside surface into which a bottom end of the air core toroid coil fits.

Preferably, the bottom center part of the weight through which the reference line passes has an impact buffer material attached to it.

Preferably, the impact buffer material is a viscoelastic material.

Preferably, the bottom lid has a recess at its center part through which the reference line passes at the inside surface.

Preferably, the bottom lid has a plurality of engagement tabs extending from its outer circumference in the radial direction, and the case body has slots in which the engagement tabs fit at edges of the bottom opening.

BRIEF DESCRIPTION OF THE DRAWINGS

These and other objects and features of the present invention will become clearer from the following description of the preferred embodiments given with reference to the attached drawings, wherein:

FIG. 5A is a cross-sectional view along the line a-a in FIG. 3A, while

FIG. 6C is a bottom view of the same;

FIG. 8A is a perspective view showing the state of the bottom lid seen from the inside, while

FIG. 10A is a bottom view showing the same hoop material, FIG. 10B is a cross-sectional view along the line b-b in FIG. 10A, and FIG. 10C is a cross-sectional view along the line c-c in FIG. 10A.

DESCRIPTION OF THE PREFERRED EMBODIMENTS

Figure 1:
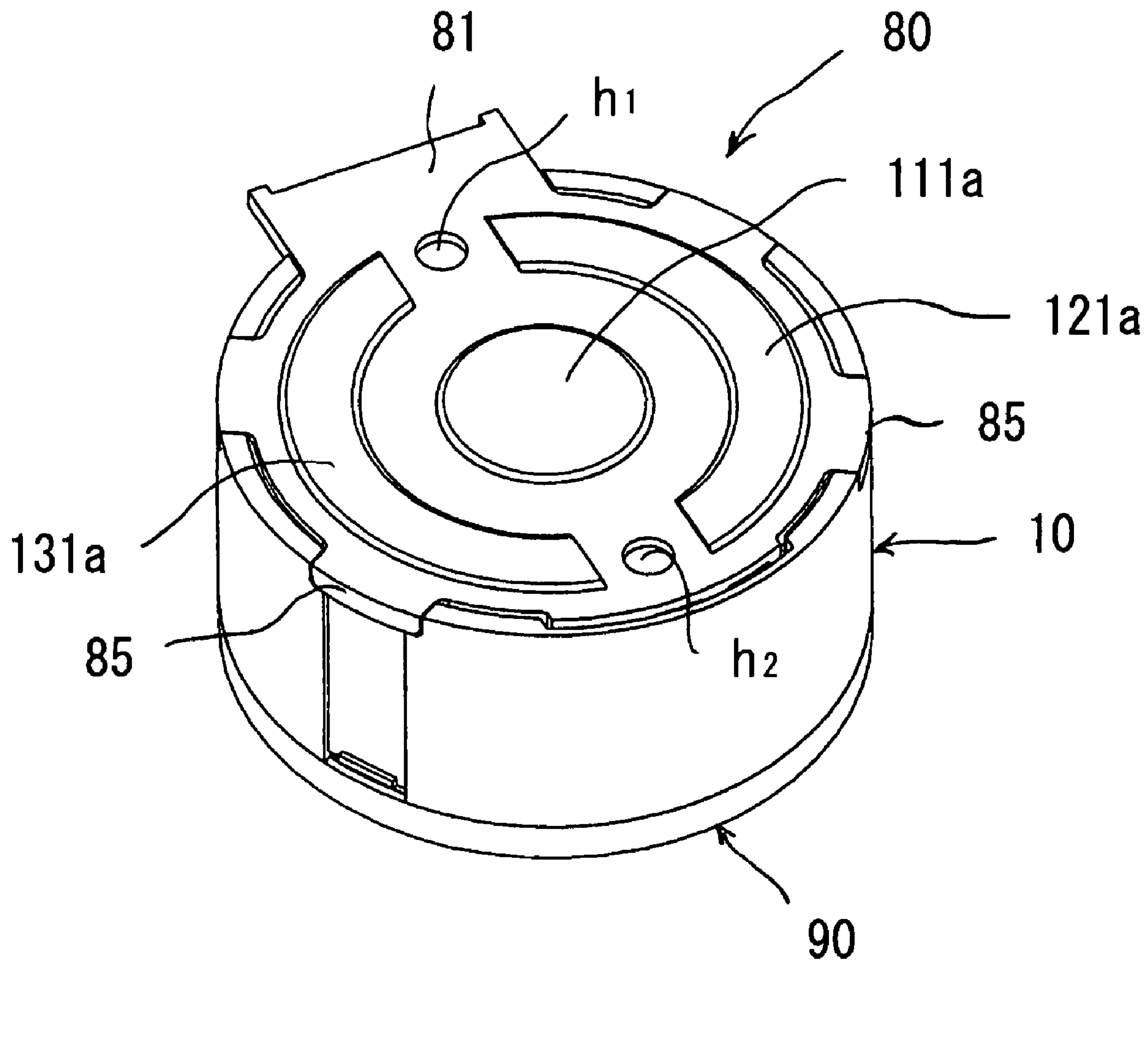
FIG. 1 is a perspective view of a reciprocal vibration generator according to the present invention as seen from the bottom lid side.

As explained above, the present invention provides a reciprocal vibration generator provided with a case body supporting an elastic member from which a weight is suspended in a space, a permanent magnet attached to the weight, and a bottom lid carrying an excitation coil for making the weight vibrate in the up-down direction by magnetic attraction or magnetic repulsion of this permanent magnet and closing a bottom opening of the case body, wherein the bottom lid is an insert molded board comprised of first and second terminal boards, each having an end connection terminal part connecting an end of the excitation coil inside the case body, insulated and separated from each other by a molding plastic, the terminal boards having board connection patterns projecting downward from a bottom surface of the molding plastic.

The board connection patterns of the first and second terminal boards form the bottom surface of the bottom lid, so the area occupied on the board is smaller and mounting on the board by solder reflow becomes possible. Further, the bottom lid is an insert molded part comprised of first and second terminal boards insulated and separated by molding plastic, so the two terminal boards form frame materials and the bottom lid can be made higher in strength and thinner in shape. Since the vibration strength is raised, even when a weight or other moving part vibrating back and forth strikes the bottom lid, cracking, plastic deformation, and other damage can be suppressed.

The board connection pattern surfaces are preferably at the outside surfaces of the recesses formed in the terminal boards in the thickness directions. The terminal boards having the recesses are high in bending strength. Further, at the time of plastic molding, it is possible to make the outside surfaces of the recesses reliably project out from the bottom surface of the molding plastic, so it is possible to secure an area for connection with the patterns on the board at the time of solder reflow without part of the molding plastic covering the board connection patterns.

When obtaining the bottom lid by insert molding, it is possible to feed two terminal boards to the mold as a continuous board hoop material and repeatedly mold the plastic, cut out two terminal boards, and forward the hoop material so as to raise the productivity. Therefore, the board connection pattern of the first terminal board is formed by the center surface of the bottom surface of the bottom lid exposed in a range including the reference point passing through the reference line in the maximum displacement direction of the elastic member. The board connection pattern of the second terminal board is preferably formed at the first surrounding surface of the bottom surface of the bottom lid exposed in the range surrounding the center surface. Even when the weight or another moving part strikes the inside surface of the bottom lid, since the center surface of the first terminal board is reinforced, cracking or other damage can be suppressed.

The terminal boards preferably have lead wire connection terminal parts of extension tabs projecting out from the case body to the sides. When mounting the reciprocal vibration generator in equipment, it is possible to handle both the case of feeding power by lead wire connections and the case of feeding power by mounting on a board by solder reflow and therefore general use becomes possible.

However, when the pair of the end connection terminals are positioned at the same single ends of the first and second terminal boards and the pair of lead wire connection terminal parts are positioned at the other single ends of the first and second terminal boards, since the first terminal board will have a pair of tabs extending out from the center surface in opposite directions, to avoid the terminal boards from crossing, the first surrounding surface ends up being positioned at only the half circumference side with respect to the center surface, so the arrangement does not become symmetric. Therefore, since the center surface and the first surrounding surface stick out somewhat from the bottom surface of the molding plastic, the posture of the vibrator generator when mounted on a board may become somewhat tilted.

Therefore, the bottom lid includes a dummy terminal board having board connection patterns sticking out from the bottom surface of the molding plastic toward the bottom as an insert member. The board connection pattern of this dummy terminal board preferably is formed at the second surrounding surface in a substantially 180° rotationally symmetric relationship with the first surrounding surface about the reference point. In this case, of course, three terminal boards can be supplied by a continuous board hoop material, and productivity can be raised. By using a dummy terminal board, the first surrounding surface and the second surrounding surface are arranged symmetrically sandwiching the center surface, so at the time of mounting on a board, the reciprocal vibration generator can be arranged in a stable posture without tilt.

The case body may also be a polygonal columnar case, but a circular cylindrical case is preferable. In this case, preferably the center surface of the bottom lid is made circular and the surrounding surfaces are made arc-shaped surfaces. Due to this, if making the board side patterns the center surface and the ring-shaped surface concentric outside of this, even if the reciprocal vibration generator is mounted on the board surface twisted somewhat at the time of mounting the chip, the two arc-shaped surfaces always contact the ring-shaped surface, so it is possible to suppress the occurrence of non-contact areas.

Further, since the pair of end connection terminal parts are positioned at the same single ends of the first and second terminal boards and the pair of lead wire connection terminal parts are positioned at the same other ends of the first and second terminal boards, even with small terminal boards, a long distance can be secured between the end connection terminal parts and lead wire connection terminal parts. When fastening lead wires to the lead wire connection terminal parts, it is therefore hard for the melting heat to be transmitted to the end connection terminal parts and possible to suppress the occurrence of connection defects at the end connection parts in the once connected case body.

The excitation coil is an air core toroid coil. When the bottom lid has a positioning circumferential groove into which the bottom end of the air core toroid coil fits at its top surface, since it is possible to fit the bottom end of the air core toroid coil in the positioning circumferential groove for attachment, then attach the bottom lid to the bottom opening of the case, assembly is facilitated. Further, it is preferable to attach an impact buffer material to the center part of the weight through which the reference line passes. When the weight strikes the bottom lid, the damper effect by the impact buffer material protects the bottom lid. Further, compared to the case where the impact buffer material is attached to the inner circumference of the bottom lid, the mass of the weight substantially increases by exactly the amount of the mass of the impact buffer material, so while the reciprocal vibration generator is small, a higher vibration strength can be obtained. Further, since there is a clearance between the bottom lid and the impact buffer material, it is hard for the melting heat at the time of solder reflow to be transmitted to the impact buffer material. However, when the impact buffer material is rubber or an elastic material, an abnormal sound is liable to be produced when the bottom lid is struck, so a viscoelastic material is preferably used.

However, when using a viscoelastic material as an impact buffer material, when the viscoelastic material strikes the inside surface of the bottom lid, it is liable to stick to the inside surface for an instant and therefore a deviation may easily occur in the advancing time and returning time of the weight. Therefore, the bottom lid preferably has a recess at the center part through which the reference line passes at the inside surface. The viscoelastic material strikes the edges of the recess in a manner covering this recess, then part of the viscoelastic material is pushed into the recess space, but air is compressed in the recess space, so no action of sticking occurs due to atmospheric pressure and deviation between the advancing time and returning time of the weight can be reduced.

This reciprocal vibration generator is closed by the bottom lid after coating a binder on the edges of the bottom opening of the case body, but if the open end of the bottom opening of the case body is formed as a step part into which the outer circumferential edge of the bottom lid may fit, the thickness of the rising part of the outer circumference of the step part is reduced, so in a dropping test of the reciprocal vibration generator etc., the backlash when the weight strongly strikes against the inside of the bottom lid can cause the case body to rapidly bounce back in the upward direction from the bottom lid and easily break at the thin rising part of the outer circumference. Therefore, the bottom lid preferably has a plurality of engagement tabs extending out from the outer circumference in a radial shape and the edges of the bottom opening of the case body have slots in which the engagement tabs fit. Since the edges of the bottom opening of the case body are not formed with step parts, the thickness does not have to be reduced. Further, since the engagement tabs and slots are alternately repeatedly arranged and a wide bonding space can be secured, the edges can be kept from breaking etc. even due to the shock of dropping of the reciprocal vibration generator.

In the reciprocal vibration generator according to the present invention, since the board connection patterns are at the bottom lid, the area occupied at the board can be reduced and the generator can be mounted on the board by solder reflow. Further, the bottom lid is an insert molded board comprised of first and second terminal boards insulated and separated by a molding plastic, so the two terminal boards serve as frame members, and the bottom lid can be increased in strength and reduced in thickness. Since the vibration strength is raised, even when the weight or other moving part vibrating back and forth strikes the bottom lid, cracking, plastic deformation, and other damage can be suppressed.

Figure 2:
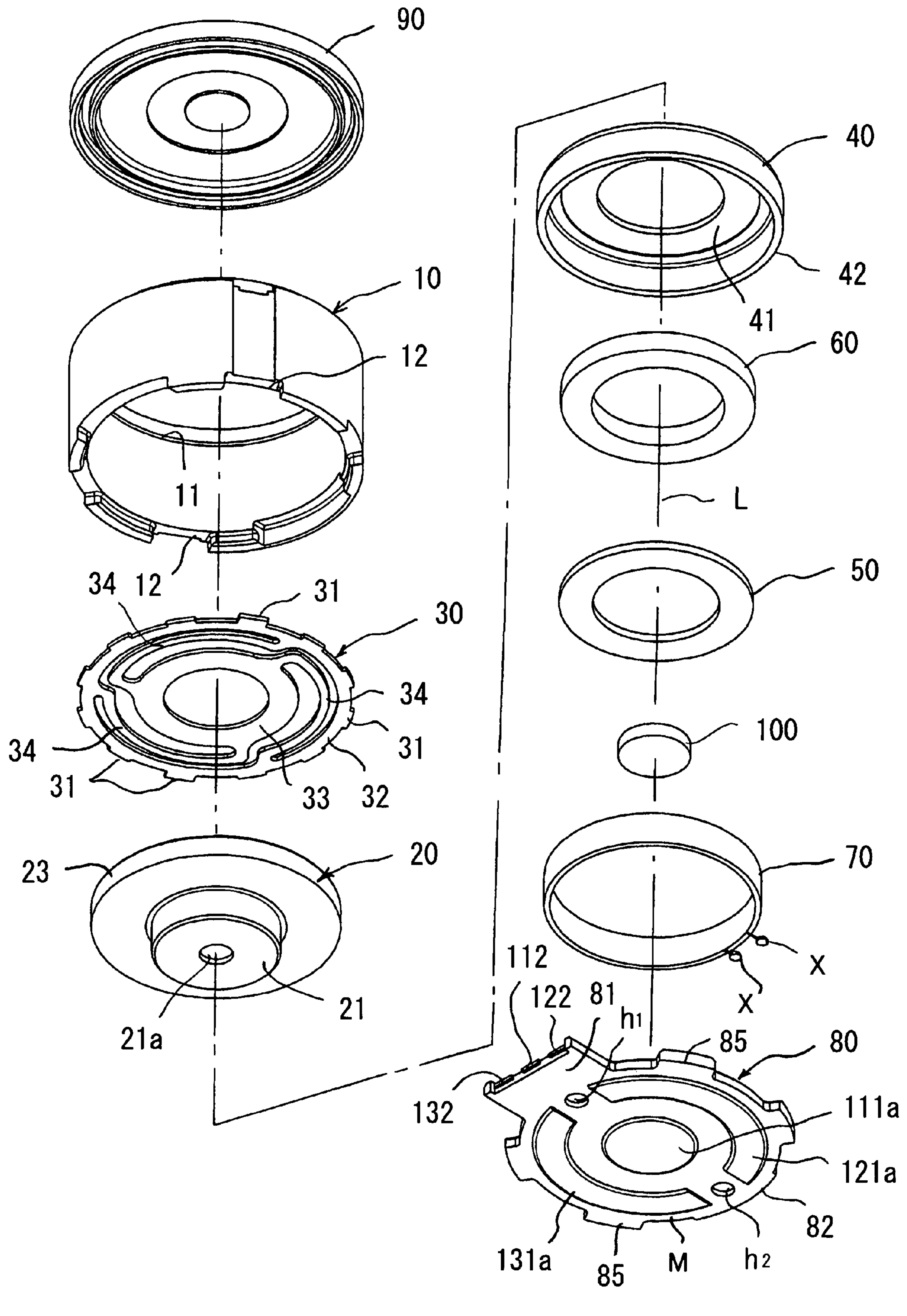
FIG. 2 is a disassembled perspective view showing the same reciprocal vibration generator.
Figure 3A:
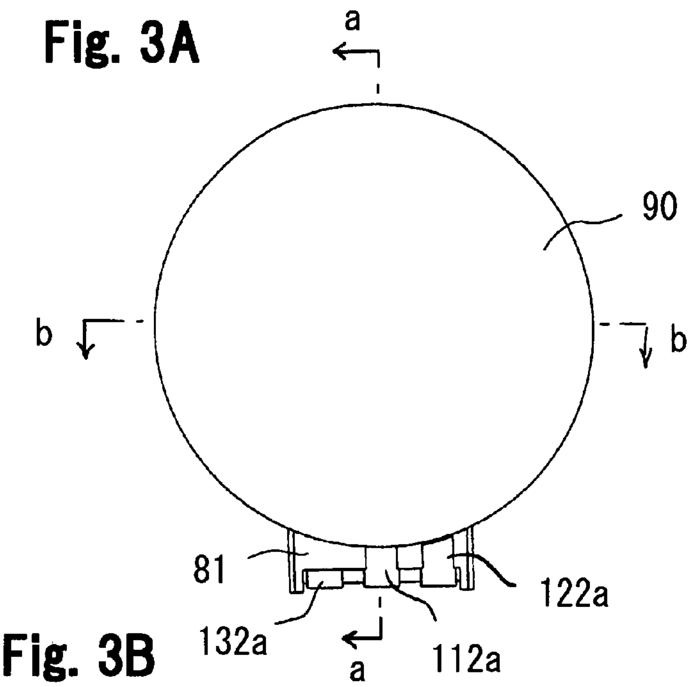
FIG. 3A is a plane view showing a reciprocal vibration generator.
Figure 3B:
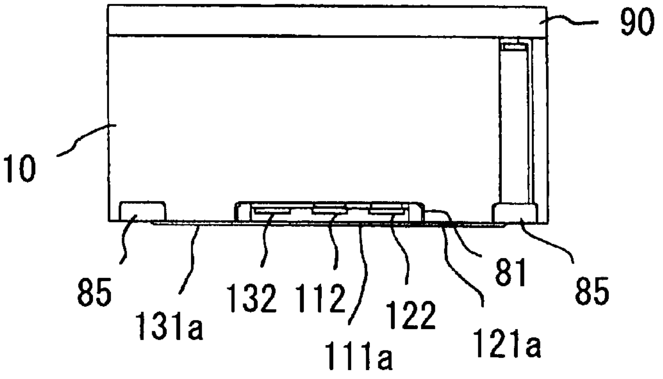
FIG. 3B is a front view of the same.
Figure 3C:
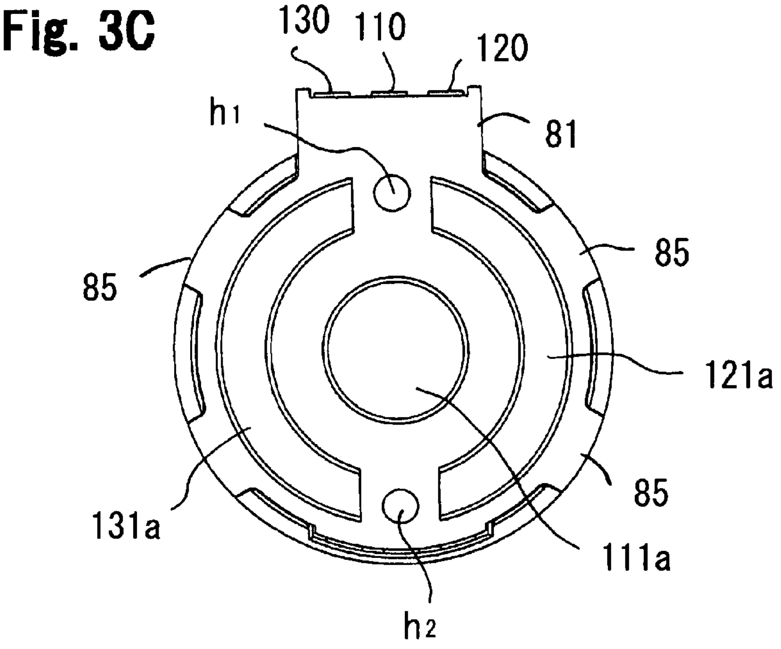
FIG. 3C is a bottom view of the same.
Figure 4A:
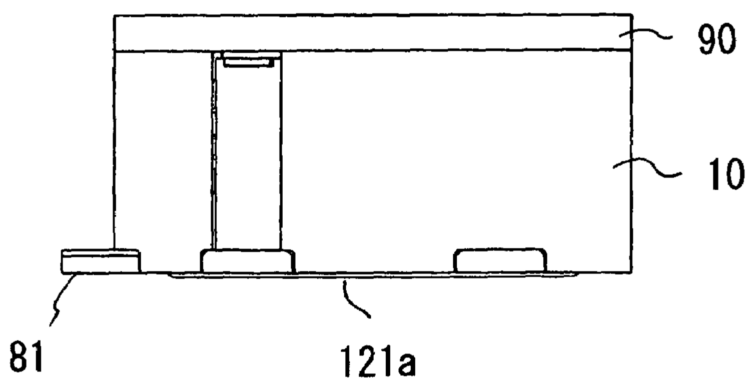
FIG. 4A is a right side view showing the same reciprocal vibration generator.
Figure 4B:
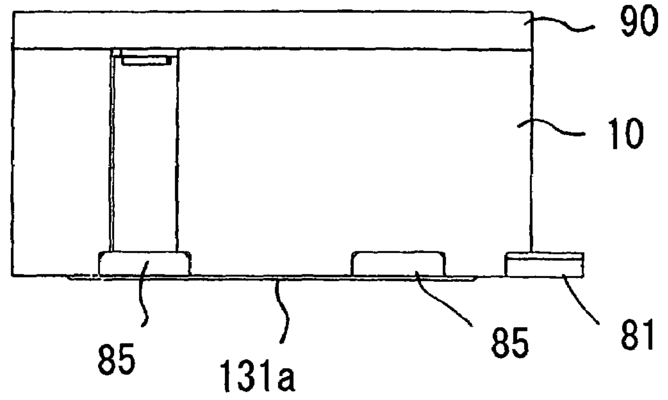
FIG. 4B is a right side view of the same.
Figure 4C:
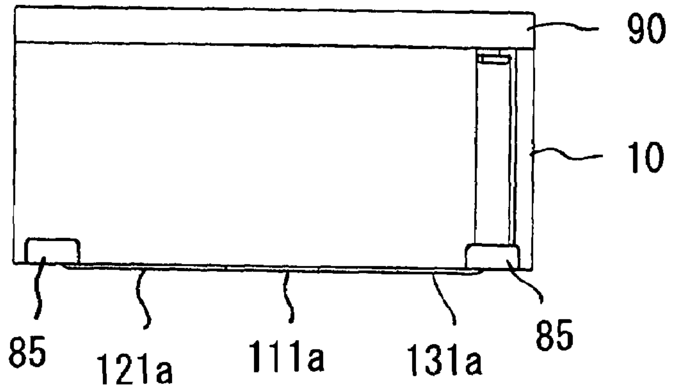
FIG. 4C is a back view of the same.
Figure 5A:
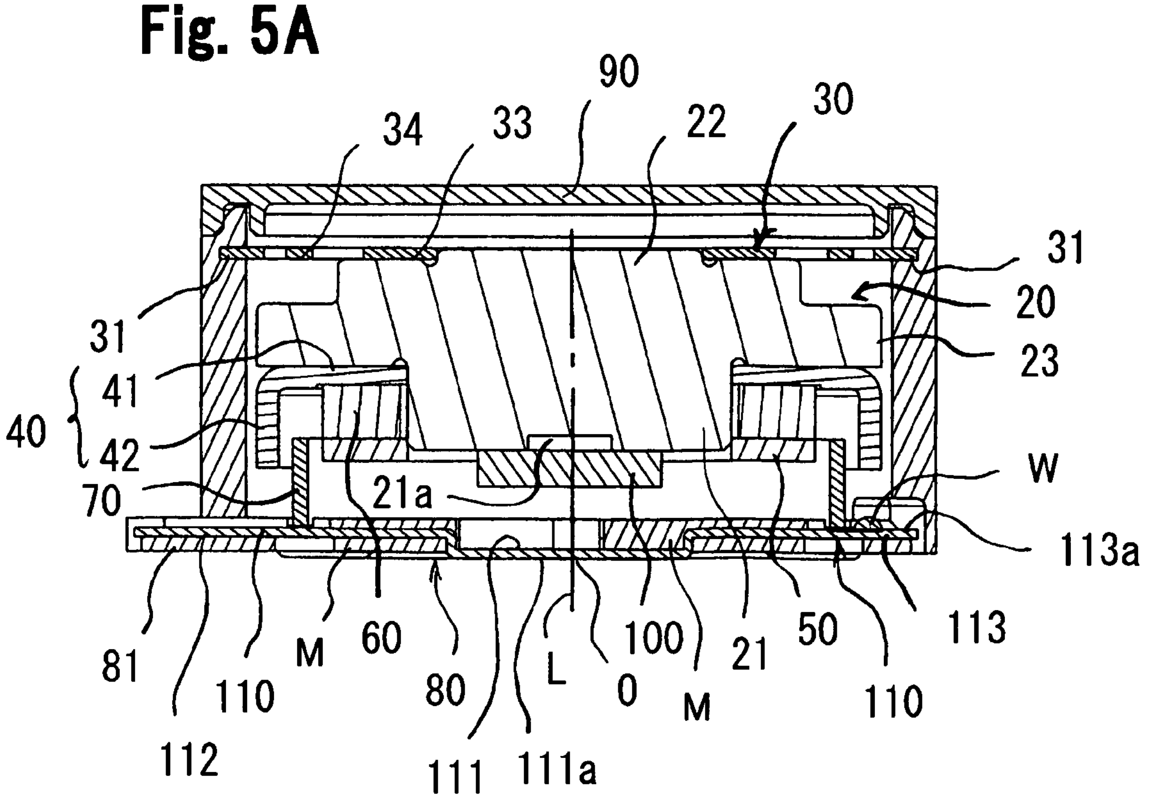
Figure 5B:
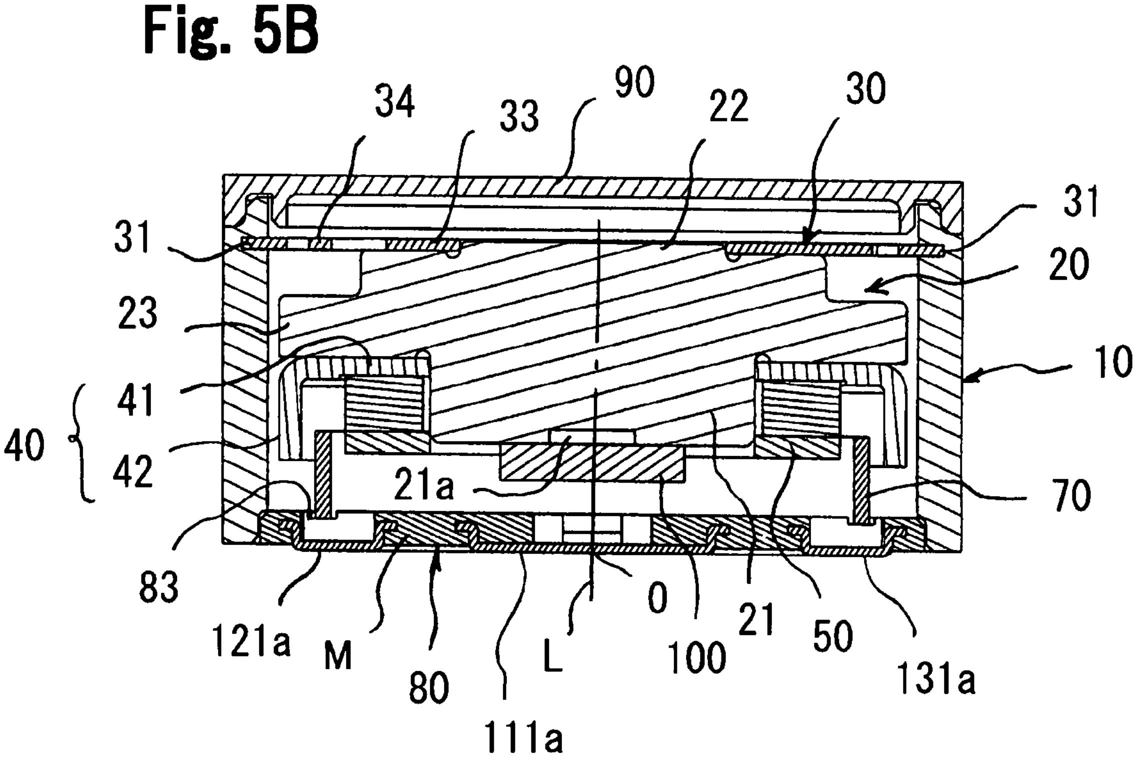
FIG. 5B is a cross-sectional view along the line b-b in FIG. 3A.

Next, an embodiment of the present invention will be explained based on the attached drawings. FIG. 1 is a perspective view of a reciprocal vibration generator according to the present invention as seen from the bottom lid side; FIG. 2 is a disassembled perspective view showing the same reciprocal vibration generator; FIG. 3A is a plane view showing a reciprocal vibration generator, FIG. 3B is a front view of the same, and FIG. 3C is a bottom view of the same; FIG. 4A is a right side view showing the same reciprocal vibration generator, FIG. 4B is a right side view of the same, and FIG. 4C is a back view of the same; and FIG. 5A is a cross-sectional view along the line a-a in FIG. 3A, while FIG. 5B is a cross-sectional view along the line b-b in FIG. 3A.

The reciprocal vibration generator of this example has a plastic cylindrical case body 10, a flat spring (elastic member) 30 from which a heavy metal weight 20 is suspended in space and with outer circumference tabs 31 fit into and supported by an inner circumference groove 11 near the top opening of the case body 10, a ring-shaped permanent magnet 60 attached to the bottom center projection 21 of the weight sandwiched between the top outer yoke 40 and bottom inner yoke 50, a bottom lid (bottom case) 80 carrying a cylindrical air core toroid coil 70 for making moving parts including the weight 20 vibrate back and forth in the up-down direction by the magnetic attraction or magnetic repulsion of this permanent magnet 60 and closing the bottom opening of the case body 10, a circular viscoelastic plate 100 serving as an impact buffer member bonded to the bottom surface of the bottom center projection 21 to cover the center recess 21*a*, and a top lid (top case) 90 closing the top opening of the case body 10.

The flat spring 30, as shown in FIG. 2, is comprised of a ring-shaped outer circumference part 32 having the plurality of outer circumference tabs 31, a ring-shaped inner circumference part 33 into which a top center two-step projection 22 of the weight 20 fits, and three serpentine elastic deforming parts 34 integrally connecting the ring-shaped outer circumference part 32 as a fixed end and the ring-shaped inner circumference part 33 as the free end in a spiral shape.

The outer yoke 40, as shown in FIG. 2 and FIG. 5, is comprised of a flat part 41 having a center hole into which the bottom center projection 21 fits and closely contacting a flange 23 of the weight 20 and a descending part 42 formed by bending the edge downward from the outer circumference and reaching the outer circumference of the air core toroid coil 70. The top surface of the ring-shaped permanent magnet 60 closely contacts the flat part 41 serving as the back yoke, while the bottom surface of the ring-shaped permanent magnet 60 closely contacts the top surface of the inner yoke 50 serving as the front yoke. The descending part 42 of the outer yoke 40 moves back and forth up and down at the ring-shaped space between the inner circumference of the case body 10 and the outer circumference of the air core toroid coil 70 and traps the magnetic flux of the ring-shaped permanent magnet 60 and the magnetic flux at the outer circumference side of the air core toroid coil 70, so prevents leakage of magnetic flux outside of the case body 10.

Figure 6A:
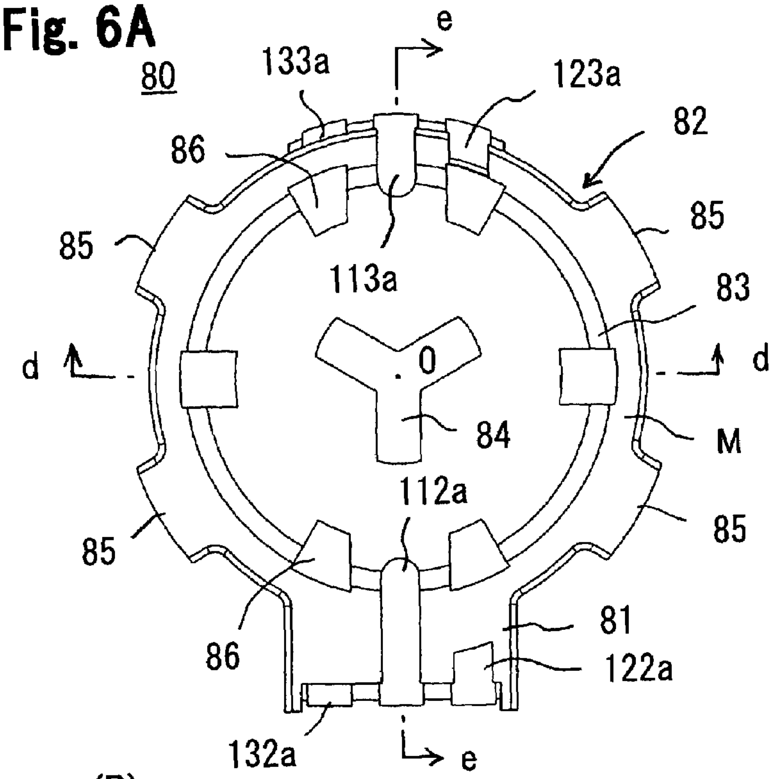
FIG. 6A is a plane view showing a bottom lid used for the same reciprocal vibration generator.
Figure 6A:
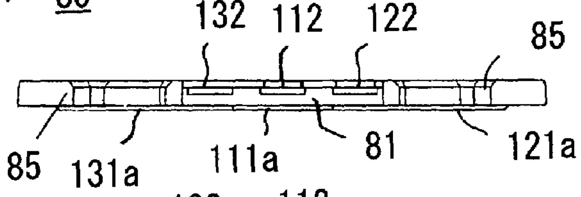
Figure 6B:
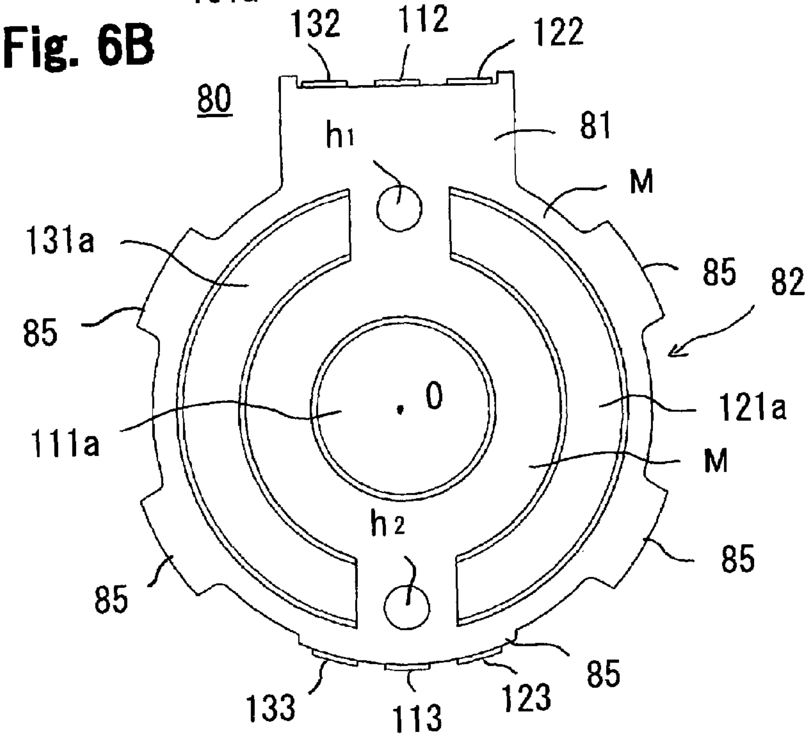
FIG. 6B is a front view of the same.
Figure 7A:
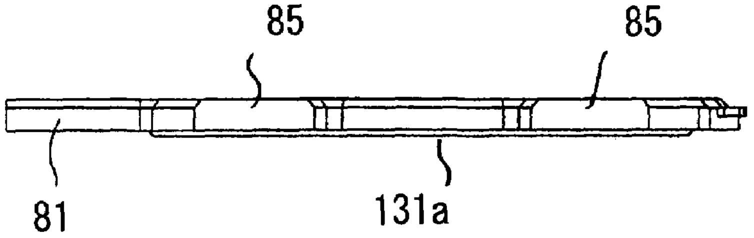
FIG. 7A is a right side view showing the same bottom lid.
Figure 7B:
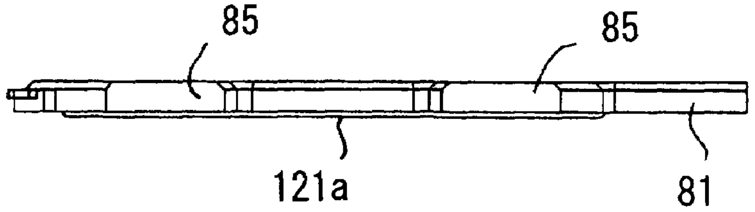
FIG. 7B is a left side view of the same.
Figure 7C:
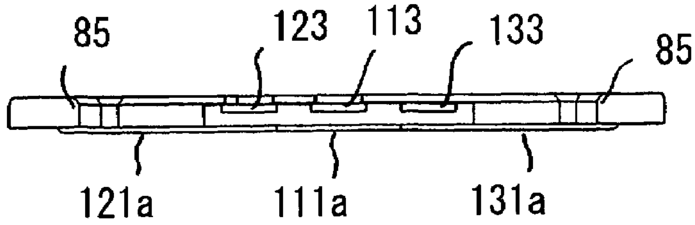
FIG. 7C is a back view of the same.
Figure 7D:
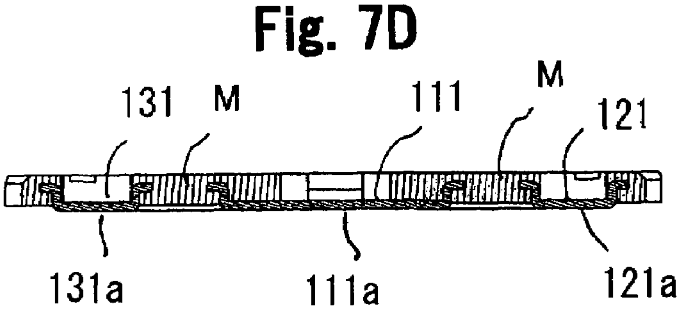
FIG. 7D is a cross-sectional view along the line d-d in FIG. 6A.
Figure 7E:
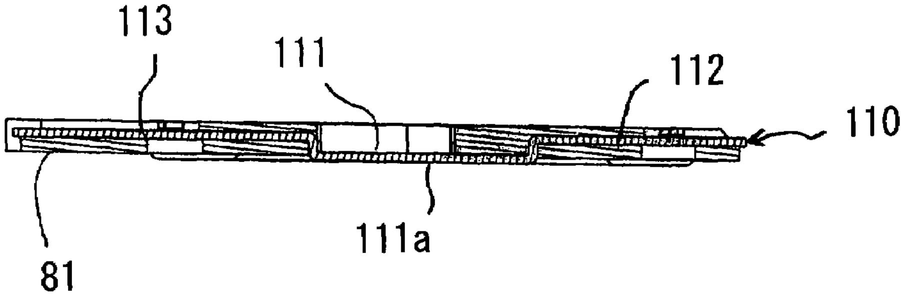
FIG. 7E is a cross-sectional view along the line e-e in FIG. 6A.
Figure 8A:
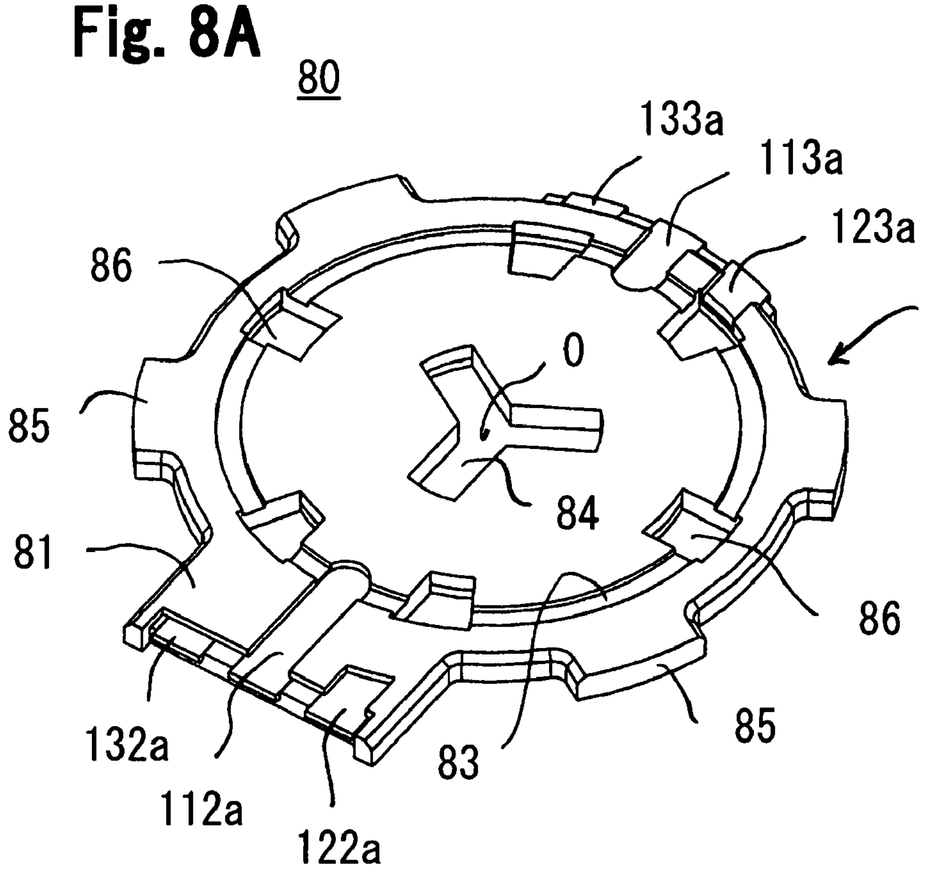
Figure 8B:
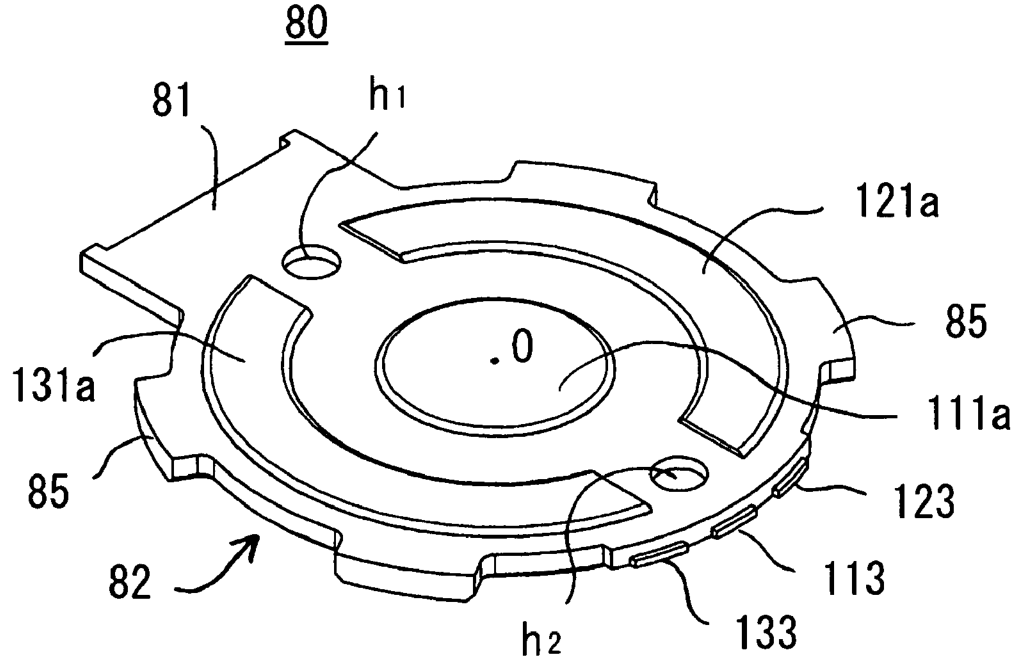
FIG. 8B is a perspective view showing the state of the bottom lid as seen from the outside.
Figure 9:
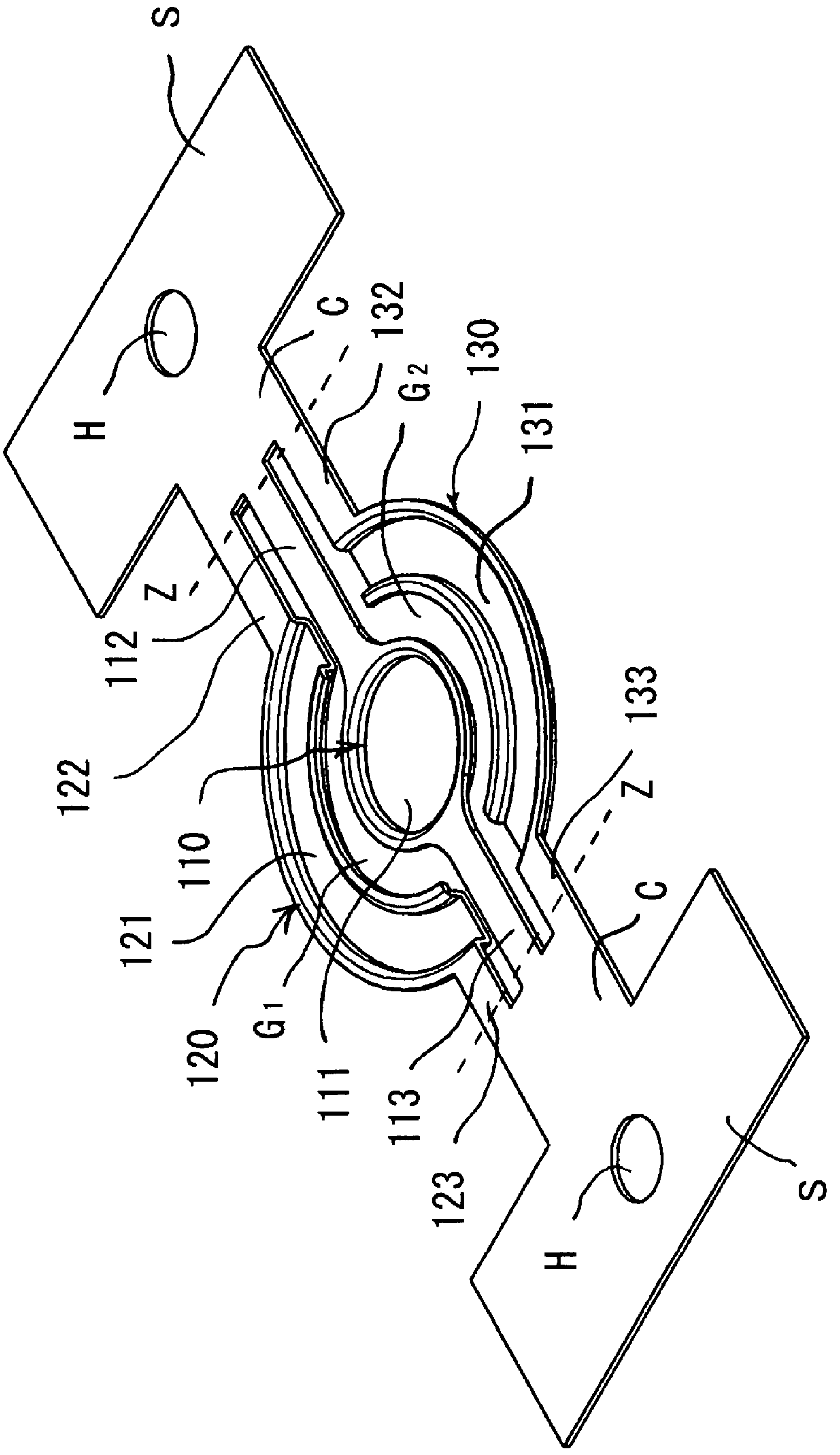
FIG. 9 is a perspective view showing a hoop material including terminal boards used for a bottom lid.

FIG. 6A is a plane view showing a bottom lid used for the same reciprocal vibration generator, FIG. 6B is a front view of the same, and FIG. 6C is a bottom view of the same; FIG. 7A is a right side view showing the same bottom lid, FIG. 7B is a left side view of the same, FIG. 7C is a back view of the same, FIG. 7D is a cross-sectional view along the line d-d in FIG. 6A, and FIG. 7E is a cross-sectional view along the line e-e in FIG. 6A; FIG. 8A is a perspective view showing the state of the bottom lid seen from the inside, while FIG. 8B is a perspective view showing the state of the bottom lid as seen from the outside; FIG. 9 is a perspective view showing a hoop material including a terminal board used for a bottom lid; FIG. 10A is a bottom view showing the same hoop material, FIG. 10B is a cross-sectional view along the line b-b in FIG. 10A, and FIG. 10C is a cross-sectional view along the line c-c in FIG. 10A.

The bottom lid 80, as shown in FIG. 9 and FIG. 10, is an insert molded board comprised of a first terminal board 110, second terminal board 120, and dummy terminal board 130 insulated and separated by a molding plastic M. Note that FIG. 9 and FIG. 10 shows one section's worth of the hoop material supplied for insert molding. The broken line Z shows cutaway lines of the three terminal boards 110, 120, 130. The hoop material supports the three terminal boards 110, 120, 130 press formed through connections C, C between separated parallel side bands S, S with holes H. The first terminal board 110 is comprised of a center circular recess 111 and a pair of tabs 112, 113 extending from its outer circumference in parallel with each other. The second terminal board 120 is comprised of a first arc-shaped recess 121 surrounding the center circular recess 111 over an arc angle of less than half the circumference with a clearance $G_1$ from the center circular recess 111 and a pair of tabs 122, 123 extended integrally from the two ends in parallel in opposite directions. The dummy terminal board 130 is positioned at the opposite side of the first terminal board 110 from the second terminal board 120 and is comprised of a second arc-shaped recess 131 surrounding the center circular recess 111 over an arc angle of less than half the circumference with a clearance $G_2$ from the center circular recess 111 and a pair of tabs 132, 133 extended integrally from the two ends in parallel in opposite directions. The relative arrangement of the three terminal boards 110, 120, 130 shown in FIG. 10A is held even after insert molding, but since the center line (reference line) L shown by the one-dot chain line of FIG. 2 and FIG. 5 passes through the center point O of FIG. 10A, the first terminal board 120 and dummy terminal board 130 are rotationally symmetric 180° about the center point O. Note that the tabs 112, 122, 132 are somewhat longer than the tabs 113, 123, 133.

The end top surfaces 113*a*, 123*a*, 133*a* of the tabs 113, 123, 133 are not covered by the molding plastic M. Among these, the end top surface 113*a* of the first terminal board 110 and the end top surface 123*a* of the second terminal board 120 function as coil end connection terminal parts. The end X of the air core toroid coil 70 is connected by solder buildup W (see FIG. 5A). The bottom lid 80 has a terminal base 81 extending out somewhat from the substantially disk shaped part 82 in the radial direction. The end top surfaces 112*a*, 122*a*, 132*a* of the tabs 112, 122, 132 are not covered by the molding plastic M. Among these, the end top surface 112*a* of the first terminal board 110 and the end top surface 122*a* of the second terminal board 120 function as lead wire connection terminal parts. The outside surface (bottom surface) 111*a* of the center circular recess 111, the outside surface (bottom surface) 121*a* of the first arc-shaped recess 121, and the outside surface (bottom surface) 131*a* of the second arc-shaped recess 131 stick out somewhat downward from the bottom surface of the molding plastic M and form the board connection patterns for connection with the patterns at the board (printed circuit board) side by solder reflow.

In this way, since the board connection patterns are at the bottom surface region of the bottom lid 80, it becomes possible to mount the generator on the board by solder reflow without especially using up the area of the board. Further, the bottom lid 80 is an insert molded board comprised of three terminal boards 110, 120, 130 insulated and separated by a molding plastic M, so the terminal boards 110, 120, 130 become frame members, and the bottom lid 80 itself can be raised in strength and reduced in thickness. Further, even when the weight 20 strikes the bottom lid 80, cracks, plastic deformation, and other damage can be suppressed. Further, the terminal boards 110, 120, 130 are press formed with recesses 111, 121, 131, so are high in strength. Further, at the time of plastic molding, the outside surfaces 111*a*, 121*a*, 131*a* of the recesses 111, 121, 131 can be made to reliably project out from the bottom surface of the molding plastic M, so it is possible to secure the connection area with patterns on the board at the time of solder reflow without part of the molding plastic M covering the board connection patterns.

Due to the presence of the dummy terminal board 130, it becomes possible to provide the outside surface 131*a* of the second recess 131 in a 180° rotational symmetric relationship with the outside surface 121*a* of the first recess 121, so the reciprocal vibration generator can be placed on the board surface without tilting when mounting it on the board. Further, even if the reciprocal vibration generator is mounted on the board surface somewhat twisted at the time of the mounting operation, since the outside surfaces 121*a*, 131*a* always contact the ring-shaped patterns at the board side as the board connection patterns, the noncontact area can be suppressed.

The bottom lid 80 has end top surfaces 112*a*, 122*a* as lead connection terminal parts on the terminal base 81 in addition to the outside surfaces 111*a*, 121*a*, 131*a* of the recesses 111, 121, 131 as the board connection patterns, so it is possible to handle both the case of feeding power by mounting on a board by solder reflow and the case of feeding power by lead wire connections and therefore general use is possible.

The coil end connection terminal parts, that is, the end top surfaces 113*a*, 123*a*, and the lead wire connection terminal parts, that is, the end top surfaces 112*a*, 122*a*, are positioned at the two ends of the terminal boards 110, 120 from each other and are separated the longest, so when fastening lead wires to the end top surfaces 112*a*, 122*a*, it becomes hard for the melting heat to be transmitted to the end top side surfaces 113*a*, 123*a* and possible to suppress connection defects at the end top surfaces 113*a*, 123*a* to which the coil terminals are once connected.

The bottom lid 80 has a positioning ring-shaped groove 83 into which the bottom end side of the air core toroid coil 70 fits at the top surface side. This positioning ring-shaped groove 83 is formed by a molding plastic M and circles a plurality of plastic slots 86 from which the top surfaces of the terminal boards 120, 130 are partially exposed. Due to this, the bottom end side of the air core toroid coil 70 can be fit in the positioning ring-shaped groove 83 for attachment, then the bottom lid 80 can be attached to the bottom opening side of the case body 10, so this facilitates assembly. Further, when attaching the lead wires to the end top side surface 122*a*, since even the plastic slots 86 radiate heat, it becomes hard for the melting heat to be transmitted to the end top side surface 123*a*. The positioning ring-shaped groove 83, as shown in FIG. 5B, is formed along the outer circumference arc-shaped edge in the arc-shaped recesses 121, 131. For this reason, the magnetic flux from the bottom end side of the air core toroid coil 70 is prevented from leaking to the outside from the bottom lid 80.

At the outside (bottom side) of the bottom lid 80, at intermediate positions between the two ends of the outside surface 121*a* of the arc-shaped recess 121 and the two ends of the outside surface 131*a* of the arc-shaped recess 131, circular plastic holes $h_1$, $h_2$ in the first terminal board 110 serve as recesses. Parts of the bottom surface of the first terminal board 110 are exposed there. When fastening the lead wires to the end top surface 112*a*, even the plastic holes $h_1$, $h_2$ radiate heat, so it is hard for the melting heat to be transmitted to the end top surface 113*a*.

At the center part through which the center line L passes at the bottom surface of the bottom center projection 21 of the weight 20, a circular viscoelastic plate 100 is attached as the impact buffer material. The center recess 21*a* can be used as a binder reservoir. Due to this circular viscoelastic plate 100, it is possible to increase the buffer effect at the time of impact with the top surface of the bottom lid 80 and suppress the occurrence of abnormal noise. Further, the circular viscoelastic plate 100 is provided not at the fixed part comprised of the bottom lid 80, but at the moving part comprised of the weight 20, so it is possible to suppress the effect of heat due to solder reflow on the circular viscoelastic plate 100 by the amount of the space between the bottom lid 80 and the circular viscoelastic plate 100.

At the top surface of the bottom lid 80, a three-way recess 84 extending from the center point O passing through the center line L in three radial directions at 120° intervals functions as the plastic hole. The bottom surface of the center recess 111 is partially exposed there. Due to this three-way recess 84, when fastening the lead wires to the end top surface 112*a*, since the three-way recess 84 also radiates heat, it becomes hard for the melting heat to be transmitted to the end top surface 113*a*. Further, when the viscoelastic plate 100 strikes the inside of the bottom lid 80 (top surface) in a manner covering the three-way recess 84, part of the viscoelastic plate 100 is pushed into the space of the three-way recess 84, but air is compressed in the space, so there is no sticking action due to the atmospheric pressure. For this reason, the deviation between the advancing time and returning time of the weight 20 can be reduced.

Further, the bottom lid 80 has a plurality of engagement tabs 85 extending from the circular plate-shaped part 82 in the radial direction including the terminal base 81. On the other hand, the case body 10 has slots 12 into which engagement tabs 85 fit at the edges of the bottom opening. When closing it, a binder is coated, then the corresponding engagement tabs 85 and slots 12 are fit together, but the edges of the case body 10 are not formed with step parts. Further, since the engagement tabs 85 and slots 12 are alternately repeatedly arranged and wide bonding space can be secured, the edges of the case body 10 can be kept from breaking etc. even due to the shock of dropping.

While the invention has been described with reference to specific embodiments chosen for purpose of illustration, it should be apparent that numerous modifications could be made thereto by those skilled in the art without departing from the basic concept and scope of the invention.

The invention claimed is:

1. A reciprocal vibration generator provided with a case body supporting an elastic member from which a weight is suspended in a space, a permanent magnet attached to the weight, and a bottom lid carrying an excitation coil for making the weight vibrate in the up-down direction by magnetic attraction or magnetic repulsion of this permanent magnet and closing a bottom opening of the case body, wherein the bottom lid is an insert molded board comprised of first and second terminal boards, each having an end connection terminal part connecting an end of the excitation coil inside the case body, insulated and separated from each other by a molding plastic, the terminal boards having board connection patterns projecting downward from a bottom surface of the molding plastic, wherein said board connection pattern surfaces are outside surfaces of recesses formed in the terminal boards in the thickness direction.

2. A reciprocal vibration generator as set forth in claim 1, wherein said board connection patterns of the first terminal board are formed at the center surface exposed at the bottom surface of the bottom lid, and board connection pattern of the second terminal board are formed at a first surrounding surface at the bottom surface of the bottom lid exposed in a range including the center surface.

3. A reciprocal vibration generator as set forth in claim 2, wherein each terminal board has lead wire connection terminal parts at extension tabs projecting to the sides further from the case body.

4. A reciprocal vibration generator as set forth in claim 3, wherein the bottom lid includes as an insert member a dummy terminal board having board connection patterns projecting downward from the bottom surface of the molding plastic, and the board connection patterns of this dummy terminal board are formed at a second surrounding surface in a substantially 180° rotationally symmetric relationship with the first surrounding surface about the reference point.

5. A reciprocal vibration generator as set forth in claim 4, wherein said center surface is circular and each surrounding surface is an arc-shaped surface.

6. A reciprocal vibration generator as set forth in claim 4, wherein a pair of the end connection terminal parts are positioned at the same ends of the first and second terminal boards and a pair of the lead wire connection terminal parts are positioned at the same other ends of the first and second terminal boards.

7. A reciprocal vibration generator as set forth in claim 1, wherein said the excitation coil is an air core toroid coil, and the bottom lid has a positioning circumferential groove at its inside surface into which a bottom end of the air core toroid coil fits.

8. A reciprocal vibration generator as set forth in claim 1, wherein the bottom center part of the weight has an impact buffer material attached to it.

9. A reciprocal vibration generator as set forth in claim 8, wherein said impact buffer material is a viscoelastic material.

10. A reciprocal vibration generator as set forth in claim 9, wherein said bottom lid has a recess at its center part at the inside surface.

11. A reciprocal vibration generator as set forth in claim 1, wherein said bottom lid has a plurality of engagement tabs extending from its outer circumference in the radial direction, and the case body has slots in which the engagement tabs fit at edges of the bottom opening.

* * * * *